United States Patent
Patten, Jr. et al.

(10) Patent No.: US 11,604,724 B2
(45) Date of Patent: Mar. 14, 2023

(54) SOFTWARE APPLICATION COMPONENT TESTING

(71) Applicant: International Business Machines Corporation, Armonk, NY (US)

(72) Inventors: Willie Robert Patten, Jr., Hurdle Mills, NC (US); Donnie Allen Smith, Jr., Raleigh, NC (US); Jeffrey N. Eisen, Newton, MA (US); Chintan Rajyaguru, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/126,776

(22) Filed: Dec. 18, 2020

(65) Prior Publication Data

US 2022/0197783 A1 Jun. 23, 2022

(51) Int. Cl.
*G06F 11/36* (2006.01)
*G06F 9/445* (2018.01)

(52) U.S. Cl.
CPC ...... *G06F 11/3692* (2013.01); *G06F 9/44526* (2013.01); *G06F 11/3684* (2013.01); *G06F 11/3688* (2013.01)

(58) Field of Classification Search
CPC ............. G06F 11/3692; G06F 11/3684; G06F 11/3688; G06F 9/44526
See application file for complete search history.

(56) References Cited

U.S. PATENT DOCUMENTS

| | | | |
|---|---|---|---|
| 7,614,042 B1* | 11/2009 | Hardy | G06F 11/3688 717/124 |
| 8,850,391 B1 | 9/2014 | Lin | |
| 9,336,126 B1* | 5/2016 | Masse | G06F 11/3664 |
| 2002/0087668 A1 | 7/2002 | San Martin | |
| 2003/0037314 A1* | 2/2003 | Apuzzo | G06F 11/3684 717/125 |
| 2004/0060044 A1 | 3/2004 | Das | |

(Continued)

FOREIGN PATENT DOCUMENTS

| | | |
|---|---|---|
| CN | 114647572 A | 6/2022 |
| DE | 102021130630 A1 | 6/2022 |

OTHER PUBLICATIONS

Combined Search and Examination Report, United Kingdom Application No. 2117329.9, dated Jun. 30, 2022, 6 pages.

(Continued)

*Primary Examiner* — Wei Y Zhen
*Assistant Examiner* — Brahim Bourzik
(74) *Attorney, Agent, or Firm* — Haley McClory

(57) ABSTRACT

Aspects of the present invention disclose a method, computer program product, and system for performing testing on a portion of an application. The method includes one or more processors identifying a test configuration for testing an application. The application comprises a plurality of components. The test configuration includes an indication to test at least one component of the application. The method further includes one or more processors testing the indicated at least one component of the application. The method further includes one or more processors determining a validation result of testing the indicated at least one component of the application.

20 Claims, 5 Drawing Sheets

(56) References Cited

U.S. PATENT DOCUMENTS

| | | | |
|---|---|---|---|
| 2006/0277439 A1* | 12/2006 | Davia | G06F 11/3676 |
| | | | 714/38.1 |
| 2011/0219359 A1* | 9/2011 | Gupta | G06F 9/44 |
| | | | 717/124 |
| 2015/0039941 A1* | 2/2015 | Kalyanasundram | ......... |
| | | | G06F 11/3692 |
| | | | 714/38.1 |
| 2017/0083430 A1* | 3/2017 | Meerovich | G06F 8/00 |
| 2017/0235661 A1* | 8/2017 | Liu | G06F 11/3688 |
| | | | 717/106 |
| 2018/0239692 A1* | 8/2018 | Kalyanasundram | ......... |
| | | | G06F 11/3696 |
| 2018/0275970 A1 | 9/2018 | Woulfe | |
| 2019/0129712 A1 | 5/2019 | Hawrylo | |
| 2019/0294531 A1 | 9/2019 | Avisror | |
| 2020/0019493 A1* | 1/2020 | Ramakrishna | G06F 11/3688 |
| 2020/0089596 A1 | 3/2020 | Barbee | |

OTHER PUBLICATIONS

Patten Jr, et al., "Software Application Component Testing", United Kingdom Application No. 2117329.9, Filed Dec. 1, 2021, 34 pages.

\* cited by examiner

SOFTWARE APPLICATION COMPONENT TESTING

BACKGROUND OF THE INVENTION

The present invention relates generally to the field of integration testing, and more particularly to testing components of a software application.

Software testing is an investigation conducted to provide stakeholders with information about the quality of the software product or service under test. Software testing can also provide an objective, independent view of the software to allow the business to appreciate and understand the risks of software implementation. Test techniques include the process of executing a program or application with the intent of finding software bugs (errors or other defects), verifying that the software product is fit for use, and other techniques. Software testing involves the execution of a software component or system component to evaluate one or more properties of interest. In general, the properties indicate the extent to which the component or system under test: meets the requirements that guided its design and development; responds correctly to all kinds of inputs; performs its functions within an acceptable time; is sufficiently usable; can be installed and run in its intended environments; and achieves the general result its stakeholders desire.

Integration testing (sometimes called integration and testing, abbreviated I&T) is the phase in software testing in which individual software modules are combined and tested as a group. Integration testing is conducted to evaluate the compliance of a system or component with specified functional requirements. Integration testing occurs after unit testing and before validation testing. Integration testing takes input of modules that have been unit tested, groups the modules in larger aggregates, applies tests defined in an integration test plan to the aggregates, and delivers as an output of the integrated system ready for system testing.

Continuous delivery (CD) is a software engineering approach in which teams produce software in short cycles, ensuring that the software can be reliably released at any time and, when releasing the software, doing so manually. Continuous delivery aims at building, testing, and releasing software with greater speed and frequency. The approach helps reduce the cost, time, and risk of delivering changes by allowing for more incremental updates to applications in production. A straightforward and repeatable deployment process is important for continuous delivery. Continuous delivery contrasts with continuous deployment, a similar approach in which software is also produced in short cycles but through automated deployments rather than manual ones.

SUMMARY

Aspects of the present invention disclose a method, computer program product, and system for performing testing on a portion of an application. The method includes one or more processors identifying a test configuration for testing an application. The application comprises a plurality of components. The test configuration includes an indication to test at least one component of the application. The method further includes one or more processors testing the indicated at least one component of the application. The method further includes one or more processors determining a validation result of testing the indicated at least one component of the application.

DETAILED DESCRIPTION

Figure 1:
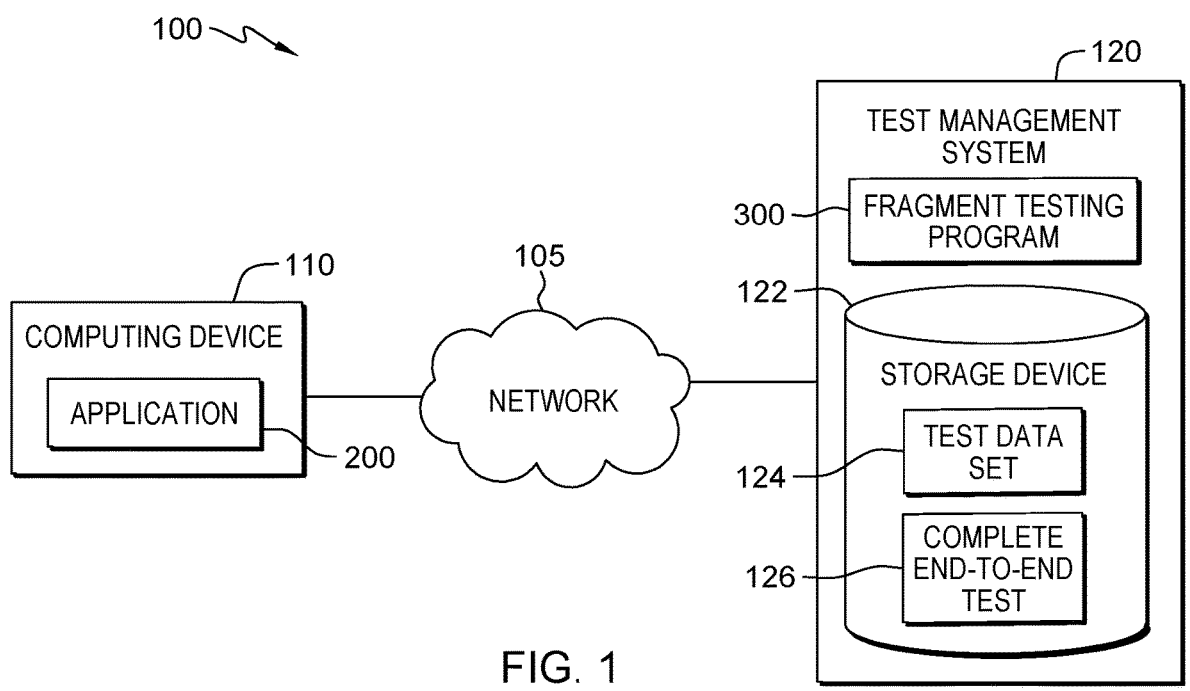
FIG. 1 is a functional block diagram of a data processing environment, in accordance with an embodiment of the present invention.

Embodiments of the present invention operate to provide a software integration testing framework that works with software change management and continuous delivery systems to automatically detect, test, and validate changes to software components, reducing the need to repeatedly run complete end-to-end integration tests. Embodiments of the present invention recognize the advantages of the corresponding process, particularly when the end-to-end integration tests are lengthy, taking several hours or even longer (e.g., for machine learning training tasks).

Some embodiments of the present invention recognize that the use of analytics that involve machine learning models requires multiple steps that involve feature generation, feature selection, model training, and other steps. The entire process can be highly involved and take a long duration of time to fully complete. In addition, while the discussed example is of machine learning, embodiments of the present invention recognize that many different implementations and functions utilize long running tests that require performing multiple prior steps before the step that that has been changed can be validated. Embodiments of the present invention recognize that resolving issues in the latter part of the process relies upon all earlier steps to be executed in order to build up the necessary information for validation.

Accordingly, embodiments of the present invention recognize that potentially an hours-long process may need to be performed before a (even relatively simple) change to an application can be validated to determine whether the change is correct and does not have an adverse effect on downstream processing of the application. Such limitations can often result in delayed validation of a fix or update, as steps within a process or application (both before and after a changed portion), must complete to ensure that the process or application is not regressing.

In various aspects, embodiments of the present invention provide a process to test/execute a set of operations (e.g., software components) of an application, without having to rerun all prior operations (e.g., software components), in order to validate the change at a later step/operation. Some of the following examples relate to integration testing, but the corresponding concepts and patterns can also extend to any multi-step testing scenario.

Embodiments of the present invention operate to execute a complete and validated end-to-end test on a system (e.g., an application that is comprised of multiple software components), which includes capturing the state (e.g., metadata and data) of each step (e.g., software component) of the system, including inputs and outputs. The validated end-to-end test is stored. Then, when re-validation is required for the system (e.g., in response to a change to one or more software components of an application), embodiments of the present invention can re-load the system to a state from the valid end-to-end test, and execute the step(s) that are affected by the change(s) that lead to re-validation. Embodiments of the present invention can then validate that the metadata and data that result from executing the step(s) is the same as the resulting metadata and data from the validated end-to-end test.

Accordingly, embodiments of the present invention recognize that existing solutions can provide an ability to restart (checkpoint) a run of a system at a point of failure. In addition, embodiments of the present invention recognize that other alternative solutions can provide the ability to capture a state and then restart at the point in time corresponding to the state. However, embodiments of the present invention recognize that such solutions do not integrate with source systems to understand the steps (and corresponding components) that need to be retested (instead leaving the determination/identification as a manual exercise). Further, embodiments of the present invention recognize that other solutions can provide an ability to use a prior output state of a component as a way to validate that changes have not happened. However, embodiments of the present invention recognize that such current solutions do not provide a complete and end-to-end process for resolving the issue.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110 and test management system 120, all interconnected over network 105. In an example embodiment, test management system 120 is representative of a computing device (e.g., one or more management servers) that can provide a software integration testing framework that works with software change management and continuous delivery systems to automatically detect, test, and validate changes to software components (e.g., of an application, such as application 200 on computing device 110), reducing the need to repeatedly run complete end-to-end integration tests. In other embodiments, data processing environment 100 can include additional instances of computing devices (not shown) that can interface with test management system 120, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between computing device 110 and test management system 120, in accordance with embodiments of the present invention. In various embodiments, network 105 facilitates communication among a plurality of networked computing devices (e.g., computing device 110 and test management system 120, and other devices not shown), corresponding users (e.g., users associated with computing device 110 and test management system 120, etc.), and corresponding management services (e.g., test management system 120).

In various embodiments of the present invention, computing device 110 may be a workstation, personal computer, personal digital assistant, mobile phone, or any other device capable of executing computer readable program instructions, in accordance with embodiments of the present invention. In general, computing device 110 are representative of any electronic device or combination of electronic devices capable of executing computer readable program instructions. Computing device 110 may include components as depicted and described in further detail with respect to FIG. 4, in accordance with embodiments of the present invention.

Computing device 110 includes application 200. In an example embodiment, computing device 110 is a personal workstation or mobile device that includes an application that is comprised of a plurality of software components. In various embodiments, computing device 110 is representative of a device that hosts application 200 (i.e., application 200 is installed on computing device 110) and receives updates for application 200. In an example, computing device 110 hosts an instance of application 200 that is updated and tested (e.g., prior to deployment to other devices, not shown), in accordance with various embodiments of the present invention. In one example scenario, computing device 110 can be a device that hosts application 200 and is a component of a software change management system. In another example scenario, computing device 110 can be a device that hosts application 200 and is a component of a continuous delivery system.

Figure 2A:
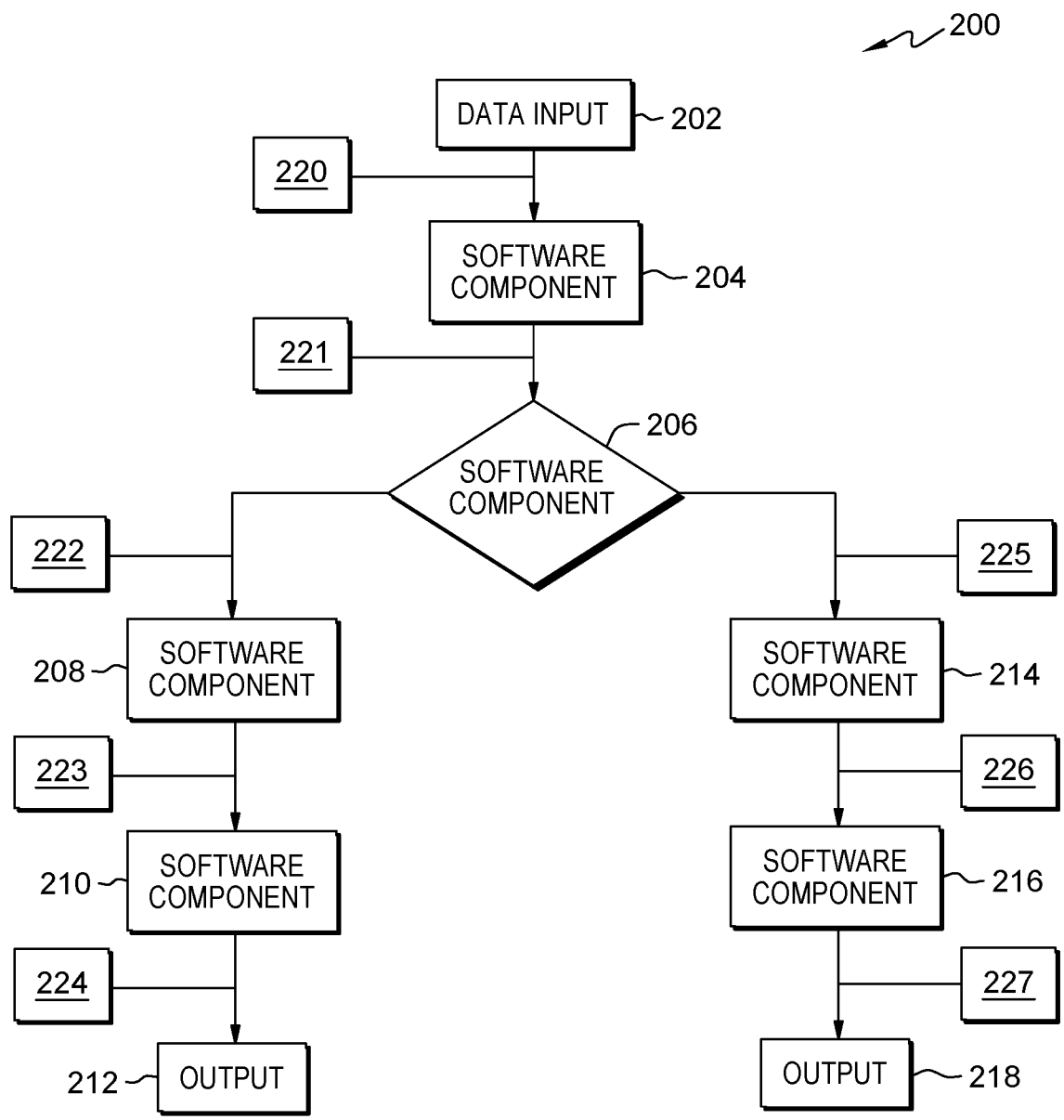
FIG. 2A depicts an example application that is comprised of a plurality of software components, in accordance with embodiments of the present invention.

FIG. 2A depicts application 200, which is representative of an application that is comprised of a plurality of software components, in accordance with various embodiments of the present invention. In the depicted example of FIG. 2A, application 200 includes data input 202, software component 204, software component 206, software component 208, software component 210, output 212, software component 214, software component 216, and output 218. In various embodiments, the software components of application 200 are representative of the processes, functions, steps, modules, etc., which make up application 200. The software components of application 200 are updated (e.g., as part of a continuous delivery process) and test management system 120 operates to validate the updates, in accordance with various embodiments of the present invention.

In addition, the example depiction of application 200 in FIG. 2A includes test bot 220, test bot 221, test bot 222, test bot 223, test bot 224, test bot 225, test bot 226, and test bot 227. In various embodiments, the test bots of application 200 capture inputs and outputs of the respective software components of application 200. In example embodiments, test bots are components of the test integration system responsible for interfacing with the application components (e.g., the test integration system associated with test management system 120. In additional embodiments, the test bots can also operate to perform a test fragment using the captured data (e.g., in accordance with operations of test management system 120 and fragment testing program 300). In other embodiments, application 200 can include more or less test bots than depicted in FIG. 2A, based on the particular operations of application 200 and test management system 120.

In example embodiments, test management system 120 can be a desktop computer, a computer server, or any other computer systems, known in the art. In certain embodiments, test management system 120 represents computer systems utilizing clustered computers and components (e.g., database server computers, application server computers, etc.) that act as a single pool of seamless resources when accessed by elements of data processing environment 100 (e.g., computing device 110 and other devices not shown). In general, test management system 120 is representative of any electronic device or combination of electronic devices capable of executing computer readable program instructions. Test management system 120 may include components as depicted and described in further detail with respect to FIG. 4, in accordance with embodiments of the present invention.

Test management system 120 includes fragment testing program 300 and storage device 122, which includes test data set 124 and complete end-to-end test 126. In various embodiments of the present invention, test management system 120 operates as a computing system that provides application testing services (for one or more deployments and/or enterprises), in accordance with embodiments of the present invention. In example embodiments, test management system 120 is representative of a computing device (e.g., one or more management servers) that can provide a software integration testing framework that works with software change management and continuous delivery systems to automatically detect, test, and validate changes to software components (e.g., of an application, such as application 200 on computing device 110), reducing the need to repeatedly run complete end-to-end integration tests.

In example embodiments, fragment testing program 300 performs testing on a portion of an application, in accordance with various embodiments of the present invention. Fragment testing program 300 can determine that a component of an application (e.g., a software component of application 200) has been changed, and in response fragment testing program 200 can identify a component of the application to test and a corresponding configuration to test the changed component. In example embodiments, fragment testing program 300 can operate to test the changed software component, without having to run all previous components of the application, thus reducing processing resources and executing time/complexity, in accordance with various embodiments of the present invention.

Storage device 122 can be implemented with any type of storage device, for example, persistent storage 405, which is capable of storing data that may be accessed and utilized by test management system 120, such as a database server, a hard disk drive, or a flash memory. In other embodiments, storage device 122 can represent multiple storage devices and collections of data within test management system 120. In various embodiments, test management system 120 can utilize storage device 122 to store data associated with testing software products, such as application 200 of computing device 110.

Test data set 124 is representative of a collection of data that test management system 120 utilizes to test application 200, in accordance with embodiments of the present invention. In various embodiments test data set 124 includes a defined and known set of data (e.g., sample data inputs to an application), which test management system 120 (and fragment testing program 200) utilizes to test application 200. In an example, test data set 124 is input into data input 202, of the example depiction of application 200 in FIG. 2A. In example embodiments, test management system 120 utilizes test data set 124 to generate complete end-to-end test 126, corresponding to application 200, for utilization with fragment testing program 300, in accordance with embodiments of the present invention.

Complete end-to-end test 126 is representative of the result of a completed and validated test of application, utilizing test data set 124 (i.e., a complete and validated end-to-end data set). In various embodiments, execution of fragment testing program 200 by test management system 120 utilizes complete end-to-end test 126, which is the result of an initial end-to-end test of application 200 utilizing a known data set (e.g., test data set 124), to capture all inputs and outputs between the software components that comprise application 200 (e.g., the software components depicted in FIG. 2A). In additional embodiments, in generating complete end-to-end test 126, test management system 120 utilizes fragment test bots (i.e., the test bots depicted in FIG. 2A) to capture input and output from the software components of application 200.

During a run of testing to establish complete end-to-end test 126, test management system 120 feeds the known data set (e.g., test data set 124) into application 200. As the fed data flows through application 200 (i.e., is processes utilizing the respective software components), the test bots capture input and output data, and capture information corresponding to each respective component of application 200. Test management system 120 can then store the captured input/output data and information as complete end-to-end test 126, corresponding to application 200, in storage device 122. In various embodiments, test management system 120 (and fragment test program 200) can utilize data of complete end-to-end test 126 and the test bots of application 200 to test fragments or portions (e.g., individual software components or modules), in accordance with various embodiments of the present invention.

In some embodiments, the testing framework of test management system 120 can integrate with software change management systems to record changes to software components of an application during a software development process. For example, in response to detecting a change, the testing framework of test management system 120 can store details of the change for utilization of testing a validation, in accordance with various embodiments of the present invention.

In an example embodiment, the testing framework of test management system 120 can integrate with software change management systems utilizing a test fragment plugin (not shown). For example, a plugin on computing device 110 that notifies test management system 120 of changes to application 200. In an example scenario, when changes to application 200 (e.g., a source file) are committed to the software change management system, the test fragment plugin detects the change and sends a component change packet, and a corresponding timestamp indicating when the change was made, to test management system 120. In additional embodiments, test management system 120 can map the received change indication to an integration test suite (e.g., and store in storage device 122), for utilization in testing the changed component of the application (utilizing fragment testing program 300), in accordance with embodiments of the present invention.

In further embodiments, the testing framework of test management system 120 can integrate with continuous delivery systems to run integration test fragments on software components of an application that have changed since a previous build of the application. In example embodiments, a test fragment is a subset of a complete integration test suite (e.g., complete end-to-end test 126), to test one or more software components of an application.

In example embodiments, the testing framework of test management system 120 can integrate with continuous delivery systems to run one or more integration test suites when the continuous delivery system builds and deploys an application. For example, the testing framework of test management system 120 can integrate with continuous delivery systems utilizing a test fragment plugin (as discussed above). In further embodiments, when an application is built and deployed, the continuous delivery system (and test management system 120) can utilize the test fragment plugin to facilitate performing testing for the application. For example, test management system 120 can interact with the test fragment plugin to determine/provide a required test suite configuration, and instantiate test fragment bots to test the application, in accordance with embodiments of the present invention.

In another embodiment, the testing framework of test management system 120 can be manual, or semi-manual, with a software change management system that is augmented by the software integration testing framework to allow for testing of an application to skip one or more steps (e.g., software components) when performing an end-to end test of an application.

FIG. 2A depicts application 200, which is representative of an application that is comprised of a plurality of software components, in accordance with various embodiments of the present invention. In the depicted example of FIG. 2A, application 200 includes data input 202, software component 204, software component 206, software component 208, software component 210, output 212, software component 214, software component 216, and output 218. In various embodiments, the software components of application 200 are representative of the processes, functions, steps, modules, etc., which make up application 200. In addition, the example depiction of application 200 in FIG. 2A includes test bot 220, test bot 221, test bot 222, test bot 223, test bot 224, test bot 225, test bot 226, and test bot 227. In various embodiments, the test bots of application 200 capture inputs and outputs of the respective software components of application 200.

Figure 2B:
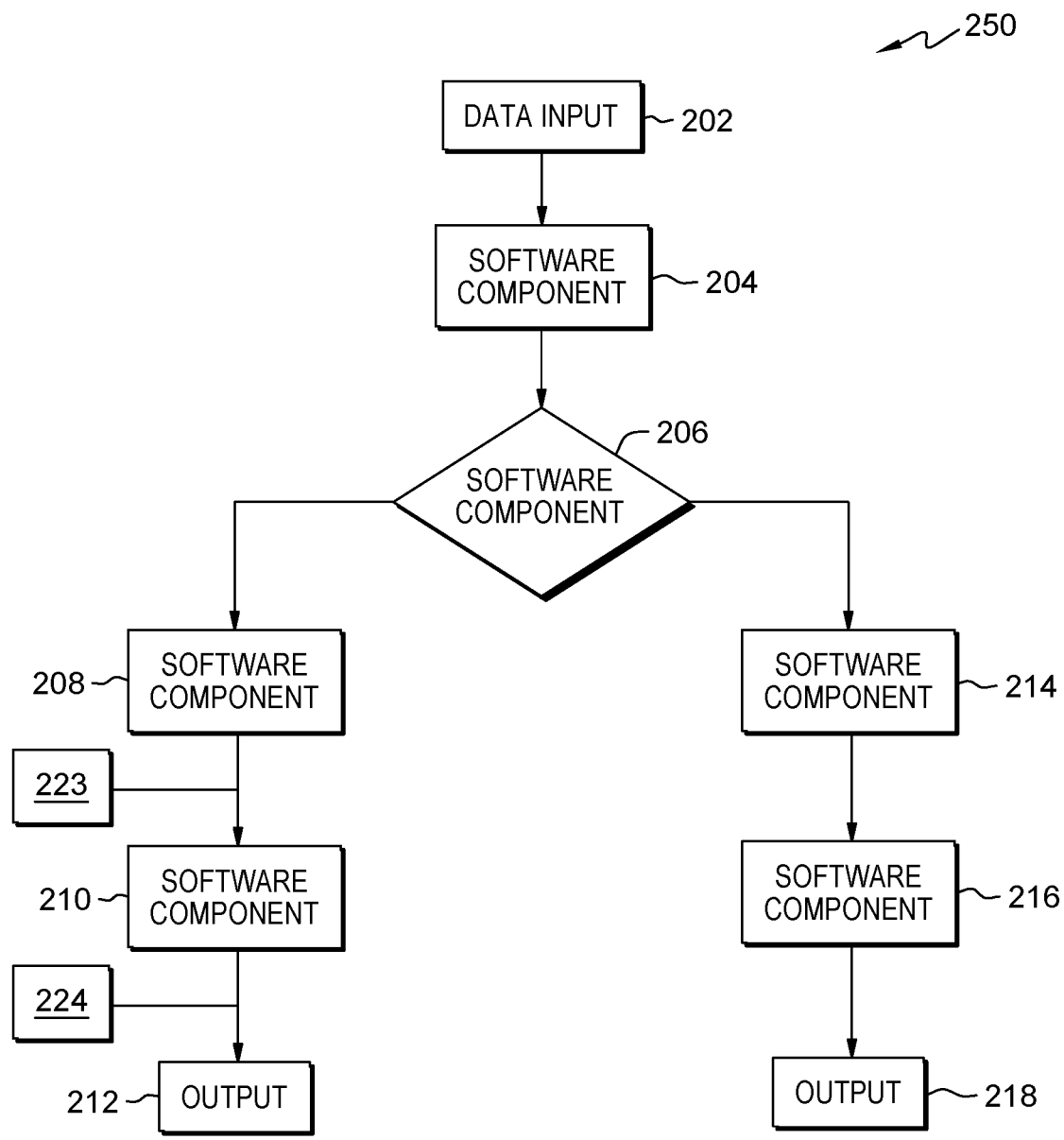
FIG. 2B depicts an example application that is comprised of a plurality of software components, in accordance with embodiments of the present invention.

FIG. 2B depicts application 250, which is representative of an application that is comprised of a plurality of software components, in accordance with various embodiments of the present invention. In example embodiments, application 250 is representative of application 200 (depicted in FIG. 2A) with at least one change or update to the software components that comprise application 200 (e.g., a change to software component 210). In the depicted example of FIG. 2A, application 250 includes data input 202, software component 204, software component 206, software component 208, software component 210, output 212, software component 214, software component 216, and output 218. In various embodiments, the software components of application 250 are representative of the processes, functions, steps, modules, etc., which make up application 250. In addition, the example depiction of application 250 in FIG. 2B includes test bot 223 and test bot 224. In various embodiments, the test bots of application 250 capture inputs and outputs of the respective software components of application 250, which fragment testing program 300 can utilize to test software component 210, in accordance with an example embodiment of the present invention.

Figure 3:
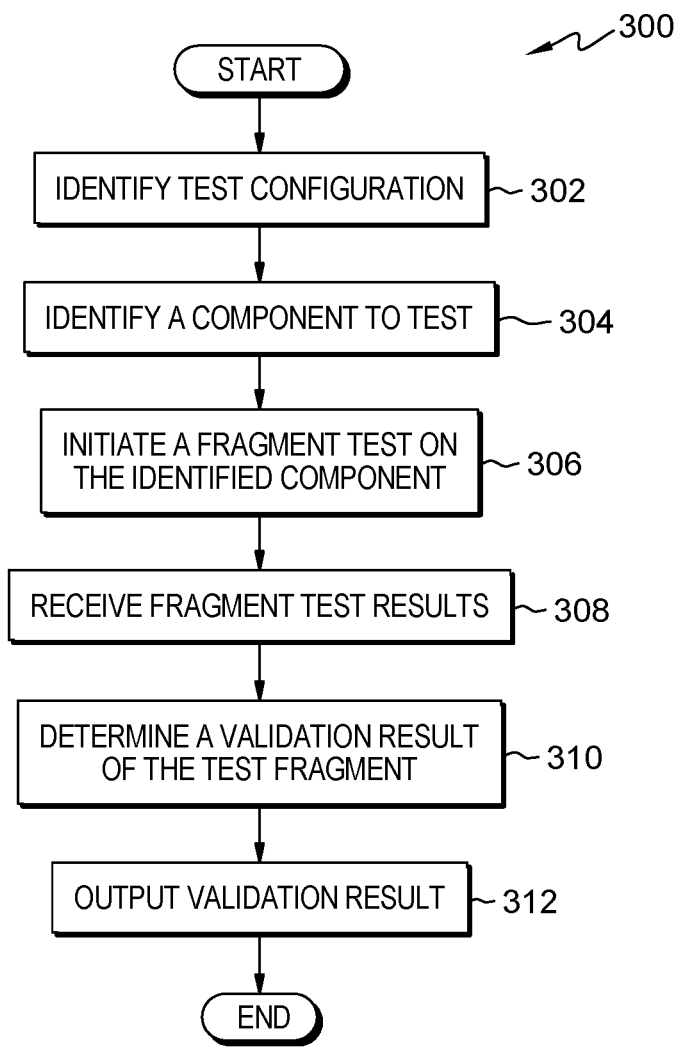
FIG. 3 is a flowchart depicting operational steps of a program for performing testing on a portion of an application, in accordance with embodiments of the present invention.

FIG. 3 is a flowchart depicting operational steps of fragment testing program 300, a program for performing testing on a portion of an application, in accordance with embodiments of the present invention. In one embodiment, fragment testing program 300 initiates and operates to test an application (e.g., application 200) or a software product. In an example embodiment, fragment testing program 300 initiates in response to identifying, or receiving an indication of, a change to one or more components of an application. In various embodiments, fragment testing program 300 operates to test a portion (a fragment) of an application. Accordingly, fragment testing program 300 can operate to automatically detect, test, and validate changes to software components, thus reducing the need to repeatedly run a complete (potentially lengthy and resource-intensive) end to end integration test for an application e.g., application 200).

In step 302, fragment testing program 300 identifies the test configuration. In one embodiment, fragment testing program 300 fetches the test configuration, which includes an indication or one or more components of application 200 to test (e.g., software components that have changed since a previous test). In an example embodiment, a change management system can track and aggregate changes to components of application 200 into a test suite or test configuration. Once the test suite or test configuration is generated and stored, fragment testing program 300 can operate to perform one or more test fragments on application 200, without requiring performance of a complete end-to-end integration test. In various embodiments, the test configuration can include a configuration to run all test fragments, a subset of all test fragments, or only test fragments that correspond to software components of application 200 that have changed since the most recent test of application 200.

In an example scenario, test management system 120 receives an indication (e.g., from a plugin on computing device 110) that a change has been made to software component 210 of application 200. Accordingly, test management system 120 generates a test suite that includes a test configuration to test software component 210 of application 200. In this example, in response to initiating to test application 200, fragment testing program 300 identifies the test configuration that includes an indication to test software component 210 of application 200. In various embodiments, fragment testing program 300 can advantageously operate to test the changed portions of application 200 thus reducing the resource usage of test management system 120, by not running a complete end-to-end test of application 200.

In step 304, fragment testing program 300 identifies a component to test. In one embodiment, fragment testing program 300 parses the identified test configuration (from step 302) to identify a component of application 200 to test. In another embodiment, fragment testing program 300 can identify multiple components of application 200 to test, based on a test suite of the test configuration (i.e., corresponding to an amount of change to application 200). Fragment testing program 300 can execute to test the multiple components concurrently or execute separate instances of fragment testing program 300 to test the multiple components (e.g., based on client/customer specifications).

In the previously discussed example scenario, fragment testing program 300 identifies the test configuration (in step 302) that includes an indication to test software component 210 of application 200. Accordingly, fragment testing program 300 identifies that software component 210 is the component of application 200 to test. In a further embodiment, fragment testing program 300 can operate to automatically analyze application 200 (e.g., at automated intervals, in response to receiving a request, etc.) to determine when a change is made to application 200. Then, fragment testing program 300 can identify the change to a component (e.g., to software component 210), and determine to test the changed software component of application 200, in accordance with embodiments of the present invention.

In step 306, fragment testing program 300 initiates a fragment test on the identified component. In one embodiment, fragment testing program 300 initiates a fragment test on the identified component (from step 304) of application 200. In an example embodiment, fragment testing program 300 instantiates and starts a fragment test bot for the component. Fragment testing program 300 can utilize the fragment test bot to send the proper input data (from complete end-to-end test 126) into the identified component. In another example embodiment, fragment testing program 300 can directly interact with application 200, to test the identified component that has changed.

In another embodiment, fragment testing program 300 identifies data in complete end-to-end test 126 that corresponds to input to the identified component to test. In various embodiments, complete end-to-end test 126 includes the validated inputs and outputs corresponding to the components of application 200 (utilizing test data set 124). Accordingly, fragment testing program 300 identifies data (e.g., metadata, data, information, etc.) in complete end-to-end test 126 that corresponds to inputs of the identified component of application 200.

In the previously discussed example scenario, fragment testing program 300 initiates a fragment test on software component 210 of application 200. In this example scenario, fragment testing program 300 identifies data in complete end-to-end test 126 that corresponds to inputs into software component 210. As depicted in the example of FIG. 2B, fragment testing program 300 can utilize test bot 223 to send the corresponding input data (from complete end-to-end test 126) to software component 210 for processing (per operations of application 200) testing of software component 210.

In step 308, fragment testing program 300 receives fragment test results. In one embodiment, fragment testing program 300 receives the result of the fragment rest (from step 306) on the identified component of application 200 to test (from step 304). In example embodiments, fragment testing program 300 receives the output of data from executing (e.g., testing) the component of application 200. In another embodiment, fragment testing program 300 utilizes a fragment test bot to receive the output data from the component.

In the previously discussed example scenario, fragment testing program 300 receives data output from software component 210. As depicted in the example of FIG. 2B, fragment testing program 300 can utilize test bot 224 to receive output of data from executing (e.g., testing) software component 210 of application 200.

In step 310, fragment testing program 300 determines a validation result of the test fragment. In one embodiment, fragment testing program 300 validates the received output (from step 308) from testing the identified component (of step 304) of application 200. In various embodiments, fragment testing program 300 determines whether the received results for the executed test fragment on the component of application 200 match the expected (i.e., validated) output results included in complete end-to-end test 126, corresponding to outputs from software component 210. In example embodiments, fragment testing program 300 can determine whether the output data corresponds (e.g., matches, within a defined threshold) to the corresponding output results included in complete end-to-end test 126. Accordingly, fragment testing program 300 can determine and generate test/visual indication (e.g., "Yes" or "No", "Pass" or "Fail", etc.) of the validation result.

In another embodiment, fragment testing program 300 can utilize a test fragment bot to receive outputs and perform validation results. In the example of FIG. 2B, fragment testing program 300 can utilize test bot 224 to receive output of data from executing (e.g., testing) software component 210 of application 200 and perform validation of the received output. In this example, fragment testing program 300 can receive an indication of the validation result from test bot 224.

In step 312, fragment testing program 300 outputs the validation result. In one embodiment, fragment testing program 300 sends the determined validation result (from step 310) to one or more users associated with application 200, or the associated testing of application 200. In another embodiment, fragment testing program 300 can store the determined validation result of the fragment test in storage device 122, associated with application 200.

In additional embodiments, the testing framework of test management system 120 can be configured to handle and process expected changes to output resulting from one or more code changes. In an example scenario, test management system 120 can validate changes that are made to application 200, which change the input and output values included in complete end-to-end test 126. For example, a user associated with application 200 can receive the validation result, and authorize test management system 120 to update complete end-to-end test 126 to correspond to the updated instance of application 200. In such a scenario, test management system 120 can run a subset of a complete end-to-end integration test on application 200, starting with the first changed component, capturing all input and output data throughout out the remaining testing flow. Accordingly, test management system 120 can update the instance of complete end-to-end test 126 with the new captured (and validated data), for use in future operations of fragment testing of application 200 (i.e., executions of fragment test program 300).

Figure 4:
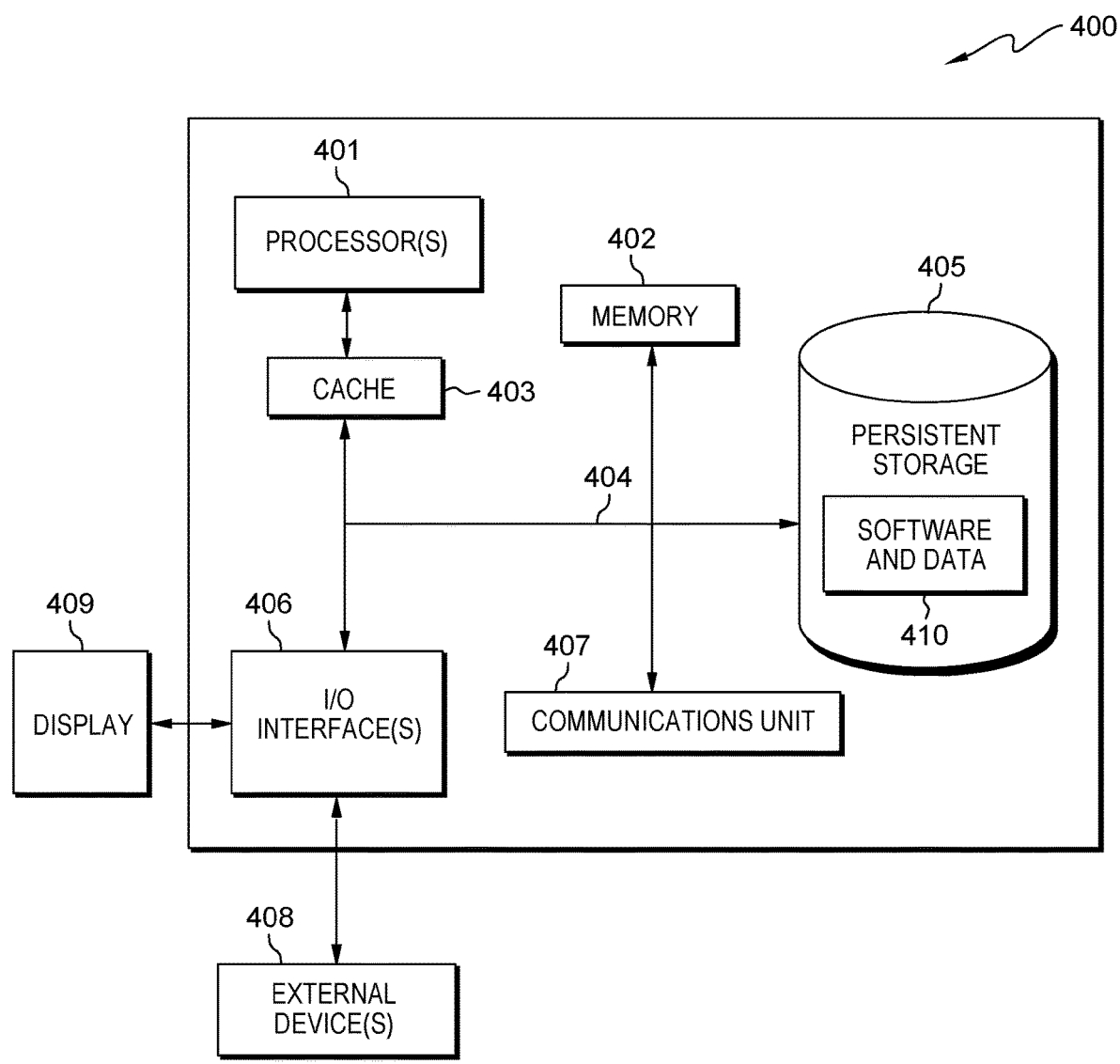
FIG. 4 depicts a block diagram of components of a computing system representative of the computing device and test management system of FIG. 1, in accordance with an embodiment of the present invention.

FIG. 4 depicts computer system 400, which is representative of computing device 110 and test management system 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to computing device 110, software and data 310 includes application 200. With respect to test management system 120, software and data 410 includes test data set 124, complete end-to-end test 126, and fragment testing program 300.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising: identifying, by one or more processors, a test configuration for testing an application, the application comprising a plurality of components, wherein the test configuration includes an indication to test at least one component of the application; receiving, by one or more processors, data output from the indicated at least one component of the application; testing, by one or more processors, the indicated at least one component of the application, wherein testing is based, at least in part, on validated data outputs associated with a validated end-to-end test data set corresponding to the application and the data output; determining, by one or more processors, a validation result of testing the indicated at least one component of the application; and updating, by one or more processors, the validated data outputs with the validation result of the indicated at least one component of the application, wherein the updated validated data outputs are added to a complete validated end-to-end test data set, wherein the complete validated end-to-end test data set is used to test at least one new component added to the application after the at least one component.

2. The method of claim 1, wherein identifying a test configuration for testing an application further comprises: determining, by one or more processors, at least one component of the application that has changed since a previous test of the application; and generating, by one or more processors, the test configuration for testing the application to include a test suite for the application, the test suite including the indication to test the at least one component of the application.

3. The method of claim 1, further comprising: running, by one or more processors, a complete end-to-end test on the application, wherein running the complete end-to-end test further comprises: feeding, by one or more processors, a test data set into the application; capturing, by one or more processors, respective inputs and outputs of each component of the application; and storing, by one or more processors, the captured respective inputs and outputs of each component of the application as the validated end-to-end test data set.

4. The method of claim 1, wherein testing the indicated at least one component of the application, further comprises: identifying, by one or more processors, validated data inputs from the validated end-to-end test data set corresponding to the application; and feeding, by one or more processors, the validated data inputs into the indicated at least one component of the application.

5. The method of claim 1, wherein testing the indicated at least one component of the application, further comprises: comparing, by one or more processors, the received data output to the validated data outputs from the validated end-to-end test data set corresponding to the application.

6. The method of claim 1, further comprising: sending, by one or more processors, the determined validation result to a user associated with the application, the determined validation result indicating whether the indicated at least one component of the application passes testing validation.

7. The method of claim 2, wherein determining the at least one component of the application that has changed since a previous test of the application further comprises: receiving, by one or more processors, indications of changes to the application for a software change management plugin associated with the application.

8. A computer program product comprising: one or more computer readable storage media and program instructions stored on the one or more computer readable storage media, the program instructions comprising: program instructions to identify a test configuration for testing an application, the application comprising a plurality of components, wherein the test configuration includes an indication to test at least one component of the application; program instructions to receive data output from the indicated at least one component of the application; program instructions to test the indicated at least one component of the application, wherein testing is based, at least in part, on validated data outputs associated with a validated end-to-end test data set corresponding to the application and the data output; program instructions to determine a validation result of testing the indicated at least one component of the application; and program instructions to update the validated data outputs with the validation result of the indicated at least one component of the application, wherein the updated validated data outputs are added to a complete validated end-to-end test data sets wherein the complete validated end-to-end test data set is used to test at least one new component is added to the application after the at least one component.

9. The computer program product of claim 8, wherein the program instructions to identify a test configuration for testing an application further comprise program instructions to: determine at least one-component of the application that has changed since a previous test of the application; and generate the test configuration for testing the application to include a test suite for the application, the test suite including the indication to test the at least one component of the application.

10. The computer program product of claim 8, further comprising program instructions, stored on the one or more computer readable storage media, to: run a complete end-to-end test on the application, wherein the program instructions to run the complete end-to-end test further comprise program instructions to: feed a test data set into the application; capture respective inputs and outputs of each component of the application; and store the captured respective inputs and outputs of each component of the application as the validated end-to-end test data set.

11. The computer program product of claim 8, wherein the program instructions to test the indicated at least one component of the application, further comprise program instructions to: identify validated data inputs from the validated end-to-end test data set corresponding to the application; and feed the validated data inputs into the indicated at least one component of the application.

12. The computer program product of claim 8, wherein the program instructions to test the indicated at least one component of the application, further comprise program instructions to: compare the received data output to the validated data outputs from the validated end-to-end test data set corresponding to the application.

13. The computer program product of claim 8, further comprising program instructions, stored on the one or more computer readable storage media, to: send the determined validation result to a user associated with the application, the determined validation result indicating whether the indicated at least one component of the application passes testing validation.

14. A computer system comprising: one or more computer processors; one or more computer readable storage media; and program instructions stored on the computer readable storage media for execution by at least one of the one or more processors, the program instructions comprising: program instructions to identify a test configuration for testing an application, the application comprising a plurality of components, wherein the test configuration includes an indication to test at least one component of the application; program instructions to receive data output from the indicated at least one component of the application; program instructions to test the indicated at least one component of the application wherein testing is based, at least in part, on validated data outputs associated with a validated end-to-end test data set corresponding to the application and the data output; program instructions to determine a validation result of testing the indicated at least one component of the application; and program instructions to update the validated data outputs with the validation result of the indicated at least one component of the application, wherein the updated validated data outputs are added to a complete validated end-to-end test data sets wherein the complete validated end-to-end test data set is used to test at least one new component added to the application after the at least one component.

15. The computer system of claim 14, wherein the program instructions to identify a test configuration for testing an application further comprise program instructions to: determine at least one component of the application that has changed since a previous test of the application; and generate the test configuration for testing the application to include a test suite for the application, the test suite including the indication to test the at least one component of the application.

16. The computer system of claim 14, further comprising program instructions, stored on the computer readable storage media for execution by at least one of the one or more processors, to: run a complete end-to-end test on the application, wherein the program instructions to run the complete end-to-end test further comprise program instructions to: feed a test data set into the application; capture respective inputs and outputs of each component of the application; and store the captured respective inputs and outputs of each component of the application as the validated end-to-end test data set.

17. The computer system of claim 14, wherein the program instructions to test the indicated at least one component of the application, further comprise program instructions to: identify validated data inputs from the validated end-to-end test data set corresponding to the application; and feed the validated data inputs into the indicated at least one component of the application.

18. The computer system of claim 14, wherein the program instructions to test the indicated at least one component of the application, further comprise program instructions to: compare the received data output to the validated data outputs from the validated end-to-end test data set corresponding to the application.

19. The computer system of claim 14, further comprising program instructions, stored on the computer readable storage media for execution by at least one of the one or more processors, to: send the determined validation result to a user associated with the application, the determined validation result indicating whether the indicated at least one component of the application passes testing validation.

20. The computer system of claim 14, wherein the program instructions to determine the at least one component of the application that has changed since a previous test of the application further comprise program instructions to:

receive indications of changes to the application for a software change management plugin associated with the application.

\* \* \* \* \*